(12) United States Patent
Balannik et al.

(10) Patent No.: US 9,014,344 B2
(45) Date of Patent: Apr. 21, 2015

(54) METHODS AND APPARATUS TO SEND VOICE MESSAGES

(75) Inventors: Vadim Balannik, Arlington Heights, IL (US); Patrick Dell Ellis, Lake in the Hills, IL (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/207,193

(22) Filed: Aug. 10, 2011

(65) Prior Publication Data

US 2013/0040609 A1 Feb. 14, 2013

(51) Int. Cl.
*H04M 1/64* (2006.01)
*H04M 3/533* (2006.01)

(52) U.S. Cl.
CPC ..................... *H04M 3/533* (2013.01)

(58) Field of Classification Search
USPC ............ 455/413, 414.1, 412.1; 379/67.1, 68, 379/88.22, 88.23, 88.25
See application file for complete search history.

(56) References Cited

U.S. PATENT DOCUMENTS

| | | | |
|---|---|---|---|
| 5,003,576 A * | 3/1991 | Helferich | 379/67.1 |
| 5,283,818 A | 2/1994 | Klausner et al. | |
| 5,390,236 A | 2/1995 | Klausner et al. | |
| 5,572,576 A | 11/1996 | Klausner et al. | |
| 5,867,793 A * | 2/1999 | Davis | 455/556.1 |
| 5,902,234 A * | 5/1999 | Webb | 600/300 |
| 6,266,399 B1 * | 7/2001 | Weller et al. | 379/88.19 |
| 6,577,859 B1 * | 6/2003 | Zahavi et al. | 455/412.1 |
| 6,580,787 B1 * | 6/2003 | Akhteruzzaman et al. | 379/88.22 |
| 6,760,412 B1 * | 7/2004 | Loucks | 379/88.13 |
| 6,816,577 B2 * | 11/2004 | Logan | 379/67.1 |
| 6,975,709 B2 * | 12/2005 | Wullert, II | 379/88.23 |
| 6,990,180 B2 * | 1/2006 | Vuori | 379/88.25 |
| 7,082,298 B2 * | 7/2006 | Enns et al. | 455/412.1 |
| 7,327,834 B1 * | 2/2008 | Hiers et al. | 379/88.18 |
| 7,376,220 B2 * | 5/2008 | Broussard et al. | 379/88.04 |
| 7,496,352 B2 * | 2/2009 | Kaminsky et al. | 455/412.2 |
| 7,496,353 B2 * | 2/2009 | Odinak | 455/413 |
| 7,747,260 B2 * | 6/2010 | Dowling et al. | 455/458 |
| 7,769,364 B2 | 8/2010 | Logan et al. | |
| 8,077,833 B2 * | 12/2011 | Ray | 379/87 |
| 8,229,083 B2 * | 7/2012 | Gilzean et al. | 379/88.12 |
| 8,265,603 B2 * | 9/2012 | Wood et al. | 455/413 |
| 2002/0023099 A1 * | 2/2002 | Wendelrup | 707/200 |

(Continued)

FOREIGN PATENT DOCUMENTS

| | | |
|---|---|---|
| EP | 2073516 | 6/2009 |
| GB | 2463759 | 3/2010 |

OTHER PUBLICATIONS

Open Mobile Reliance, OMA-COM-EVVM-2010-0045R04-CR, Support of Timed Delivery, COM EVVM, Change Request, 2010, 3 pages.

(Continued)

*Primary Examiner* — Olisa Anwah
(74) *Attorney, Agent, or Firm* — CRGO Law; Steven M. Greenberg, Esq.; Donna A. Flores, Esq.

(57) ABSTRACT

Methods and apparatus to send voice messages are disclosed. One example method includes recording a voice message using a mobile communication device; and receiving at the mobile communication device a specification of a communication from a remote device different from the mobile communication device, wherein receipt of the communication triggers sending of the voice message. Other examples are disclosed and claimed.

20 Claims, 6 Drawing Sheets

(56) References Cited

U.S. PATENT DOCUMENTS

| | | | |
|---|---|---|---|
| 2003/0087665 A1* | 5/2003 | Tokkonen | 455/556 |
| 2003/0208380 A1* | 11/2003 | Honeycutt | 705/2 |
| 2004/0066924 A1* | 4/2004 | Wertsberger | 379/201.01 |
| 2004/0266399 A1* | 12/2004 | Simpson | 455/412.1 |
| 2005/0260974 A1* | 11/2005 | Lee et al. | 455/412.2 |
| 2007/0282654 A1* | 12/2007 | Sarkar | 705/8 |
| 2010/0273443 A1* | 10/2010 | Forutanpour et al. | 455/404.1 |
| 2010/0279663 A1 | 11/2010 | Wang et al. | |
| 2011/0098022 A1 | 4/2011 | Shaw et al. | |
| 2011/0269432 A1* | 11/2011 | Abou Rjeili et al. | 455/413 |
| 2014/0113597 A1* | 4/2014 | Nielsen | 455/414.1 |

OTHER PUBLICATIONS

European Patent Office, Extended European Search Report issued in EP Application No. 11177105.1, dated Feb. 3, 2012, 9 pages.

\* cited by examiner

METHODS AND APPARATUS TO SEND VOICE MESSAGES

FIELD OF THE DISCLOSURE

The present disclosure relates generally to communications and, more particularly, to methods and apparatus to send voice messages.

BACKGROUND

Voicemail messages are typically left for a call recipient when the recipient does not answer his or her telephone. In such situations, voicemail messages are left by a caller more or less in real time with placing a call to the call recipient. Sometime later, the call recipient may contact a voicemail server to retrieve voicemail messages.

DETAILED DESCRIPTION

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

For simplicity and clarity of illustration, where considered appropriate, reference numerals may be repeated among the figures to indicate corresponding or analogous elements. In addition, numerous specific details are set forth in order to provide a thorough understanding of examples disclosed herein. However, it will be understood by those of ordinary skill in the art that examples disclosed herein may be practiced without these specific details. In other instances, well-known methods, procedures, and components have not been described in detail so as not to obscure examples disclosed herein. Also, the description is not to be considered as limiting the scope of examples disclosed herein.

Example methods, apparatus, and articles of manufacture disclosed herein may be used in connection with telephony-capable mobile devices, which may be any mobile communication device, mobile computing device, or any other element, entity, device, or service capable of communicating wirelessly. Mobile devices, also referred to as terminals, wireless terminals, mobile stations, communication stations, user equipment (UE), or user devices, may include mobile smart phones (e.g., BlackBerry® smart phones), cellular telephones, wireless personal digital assistants (PDA), tablet/laptop/notebook/netbook computers with wireless adapters, etc.

Example methods, apparatus, and articles of manufacture disclosed herein facilitate operations in a mobile device and/or an associated server. In one example, a method includes recording a voice message using a mobile communication device and receiving at the mobile communication device a specification of a communication from a remote device different from the mobile communication device. In such an example, receipt of the communication triggers sending of the voice message. The communication, which may be received by a server associated with the mobile communication device or the mobile communication device, may be an electronic mail message, a short message service communication, etc. The mobile communication device may provide feedback, such as a confirmation on a display of the mobile communication device that the voice message has been transmitted. The voice message may be sent from the mobile communication device or from the server associated with the mobile communication device, etc. The method may also include determining capabilities of a server associated with the mobile communication device.

According to another example, a method may include recording a voice message using a mobile communication device and receiving at the mobile communication device a specification of an association between an event previously entered into the mobile communication device and the voice message. In such an example, the occurrence of the event triggers sending of the voice message. The event may be any number of different occurrences, such as a meeting, an appointment, etc. The example may further include receiving at the mobile communication device information associated with the event, wherein the information associated with the event is received prior to the specification of the association between the event and the voice message. The information associated with the event may be stored at a server associated with the mobile communication device or may be stored in the mobile communication device. The voice message may be sent from the server associated with the mobile communication device or may be sent from the mobile communication device. A confirmation may be provided on a display of the mobile communication device that the voice message has been transmitted. In one example, the capabilities of the server associated with the mobile communication device may be determined or evaluated.

Figure 1:
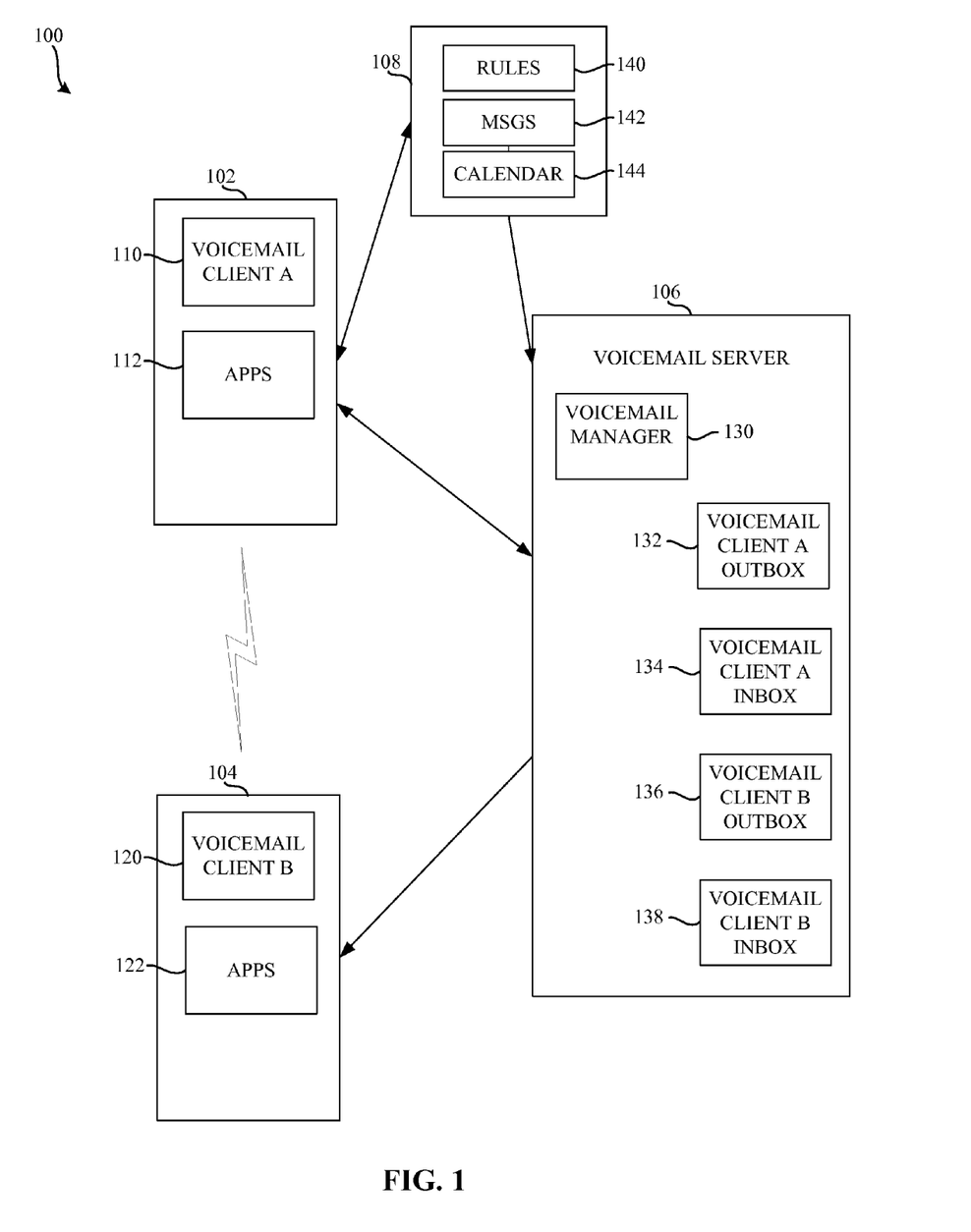
FIG. 1 depicts an example system for sending voice messages between mobile devices.

As shown in the example of FIG. 1, a first mobile device 102 desires to send a voice message to a second mobile device 104. As described below, sending the voice message from the mobile device 102 to the mobile device 104 may be contingent on receipt of communication and/or the occurrence of one or more other events (e.g., calendar events). Sending the message may include the use of voicemail server 106 and another server 108, such as an enterprise server or an electronic mail server. The contingency may be evaluated by the mobile device 102, the voicemail server 106 or the server 108. Accordingly, the voice message may be sent from the mobile device 102, the voicemail server 106, and/or the server 108.

In the example of FIG. 1, the mobile device 102 includes, among other things, a voicemail client 110 and applications 112. In practice, the mobile device 102 may be implemented by a mobile telephone, a smart phone, a tablet computer, or any suitable device. The voicemail client 110 and the applications 112 may be implemented using hardware, software, firmware, coding, or any other suitable logic to facilitate the functionality described herein. Although not pictured in FIG. 1 for the sake of clarity, the mobile device 102 may include other functionality, such as wireless communication functionality, etc. The mobile device 102 is configured to communicate with the voicemail server 106 and/or the server 108, as well as suitable data networks (e.g., cellular networks, local area networks, etc.).

The voicemail client 110 may be software executed by the mobile device 102 to allow the mobile device 102 to interface with the voicemail server 106. In this manner, the mobile device 102 may send voicemail to the voicemail server 106 via the voicemail client 110. The voicemail client 110 is shown as voicemail client A in FIG. 1 for purposes of explanation.

The applications 112 may include smart phone applications, such as an electronic mail client, a calendar application, etc. In one example, the applications 112 may include an electronic mail client that interfaces to the server 108 via any suitable data network. The applications 112 may include rules that are carried out by the mobile device 102 to facilitate sending voice messages using either the voicemail client 110 and the voicemail server 106 or the server 108, or both.

The mobile device 104 includes, among other things, a voicemail client 120 and applications 122. In practice, the mobile device 104 may be implemented by a mobile telephone, a smart phone, a tablet computer, or any suitable device. The voicemail client 120 and the applications 122 may be implemented using hardware, software, firmware, coding, or any other suitable logic to facilitate the functionality described herein. Although not pictured in FIG. 1 for the sake of clarity, the mobile device 104 may include other functionality, such as wireless communication functionality, etc. The mobile device 104 is configured to communicate with the voicemail server 106 as well as suitable data networks (e.g., cellular networks, local area networks, etc.).

The voicemail client 120 may be software executed by the mobile device 104 to allow the mobile device 104 to interface with the voicemail server 106. In this manner, the mobile device 104 may receive voicemail from the voicemail server 106 via the voicemail client 120. The voicemail client 120 is shown as voicemail client B in FIG. 1 for purposes of explanation.

As described above in conjunction with the mobile device 102, the applications 122 of the mobile device 104 may include smart phone applications, such as an electronic mail client, a calendar application, etc. For example, the applications 122 may include an electronic mail client that interfaces to an electronic mail server via any suitable data network.

The voicemail server 106 of the example of FIG. 1 includes a voicemail manager 130, a voicemail outbox for client A 132, a voicemail inbox for client A 134, a voicemail outbox for client B 136, and a voicemail inbox for client B 138. The voicemail manager 130, in addition to carrying out standard voicemail operations, may include functionality to carry out evaluations based on rules or criteria or may include functionality to facilitate the reception of a trigger from the mobile device 102 or the server 108. For example, the voicemail manager 130 may facilitate the storage of a voice message provided by the mobile device 102 in the voicemail outbox for client A 136. Subsequently, the voicemail manager 130 may evaluate one or more rules to determine if the voice message is to be transferred to the voicemail inbox for client B 138. The rules may have been previously provided to the voicemail manager 130 from the mobile device 102. In another example, the mobile device 102 or the server 108 may store and carryout the rules and, when voicemail is to be sent, the mobile device 102 or the server 108 may provide a trigger to the voicemail manager 130. In response to the trigger, the voicemail manager 130 may transfer the voice message to the voicemail inbox for client B 138, which will deliver the voice message to the mobile device 104.

The server 108 may be implemented using any suitable combination of hardware and software. For example, the server 108 may be implemented as an enterprise server. In one example, the server 108 includes a rule store 140, one or more messages 142 (e.g., electronic mail messages, voice messages, etc.), and a calendar 144 including one or more events (e.g., meetings, appointments, etc.) listed therein.

In one example, the rule store 140 includes rules or criteria that the server 108 evaluates to determine if one or more voice messages are to be sent. For example, the rules store 140 may be populated using the mobile device 102.

The messages 142 may include electronic mail messages that are to be delivered to the mobile device 102 and may also include voice messages that are transferred to the server 108 from the mobile device 102.

The calendar 144 may include events, such as appointments, meetings, or any other suitable events, that are provided by the mobile device 102. In one example, the mobile device 102 may include a calendar application that includes similar information to the calendar 144 of the server 108.

In general, during operation, a user of the mobile device 102 records a voice message designated for the mobile device 104 and designates one or more rules, the satisfaction of which results in the delivery of the voice message. The rules may include any suitable information. For example, one rule may specify that a voice message is to be delivered to the mobile device 104 when the mobile device 102 receives communication (e.g., an electronic mail, a short message service message, etc.) from the mobile device 104. In another example, a voice message may be attached to an event after the event is created. For example, a voice message may be attached to a meeting event, wherein prior to the meeting a voice message is to be sent to each of the meeting participants reminding them of the meeting.

The voice message that is to be sent may be stored in any suitable location including within the mobile device 102, within the server 108 (e.g., in the messages 142), or within the voicemail server 106. The rules governing the sending of the message may be stored and evaluated by the mobile device 102, the voicemail server 106, or the server 108. For example, the voice message may be stored in the mobile device 102 and the mobile device 102 may evaluate one or more rules to control sending of the voice message. Alternatively, if the server 108 is capable of storing the voice message (e.g., in the messages 142) and evaluating rules (e.g., from the rules store 140), the server 108 may store the voice message and evaluate the rule(s). As a further alternative, the voicemail server 106 may store the voice message and either of the mobile device 102 or the server 108 may send a trigger to the voicemail server 106 to dispatch the voice message to the intended recipient.

FIGS. 2-5 depict example flow diagrams representative of processes that may be implemented using, for example, computer-readable instructions stored on a computer-readable medium to send voice messages. The example processes of FIGS. 2-5 may be performed using one or more processors, controllers, and/or any other suitable processing devices. For example, the example processes of FIGS. 2 and 4 may be implemented using coded instructions (e.g., computer readable instructions) stored on one or more tangible computer readable media such as flash memory, read-only memory (ROM), and/or random-access memory (RAM), such as may be found in the mobile device 102 of FIG. 1. As an additional example, the example processes of FIGS. 3 and 5 may be implemented using coded instructions (e.g., computer readable instructions) stored on one or more tangible computer readable media such as flash memory, read-only memory (ROM), and/or random-access memory (RAM), such as may be found in the voicemail server 106 or the server 108 of FIG. 1.

As used herein, the term tangible computer readable medium is expressly defined to include any type of computer readable storage and to exclude propagating signals. Additionally or alternatively, the example processes of FIGS. 2-5 may be implemented using coded instructions (e.g., computer-readable instructions or machine-accessible instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information).

As used herein, the term non-transitory computer-readable medium and non-transitory machine-accessible medium are expressly defined to include any type of computer-readable medium or machine-accessible medium.

Alternatively, some or all operations of the example processes of FIGS. 2-5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all operations of the example processes of FIGS. 2-5 may be implemented manually or as any combination(s) of any of the foregoing techniques, for example, any combination of firmware, software, discrete logic and/or hardware. Further, although the example processes of FIGS. 2-5 are described with reference to the flow diagrams of FIGS. 2-5, other methods of implementing the processes of FIGS. 2-5 may be employed. For example, the order of execution of the blocks may be changed, and/or some of the blocks described may be changed, eliminated, sub-divided, or combined. Additionally, any or all operations of the example processes of FIGS. 2-5 may be performed sequentially and/or in parallel by, for example, separate processing threads, processors, devices, discrete logic, circuits, etc.

Figure 2:
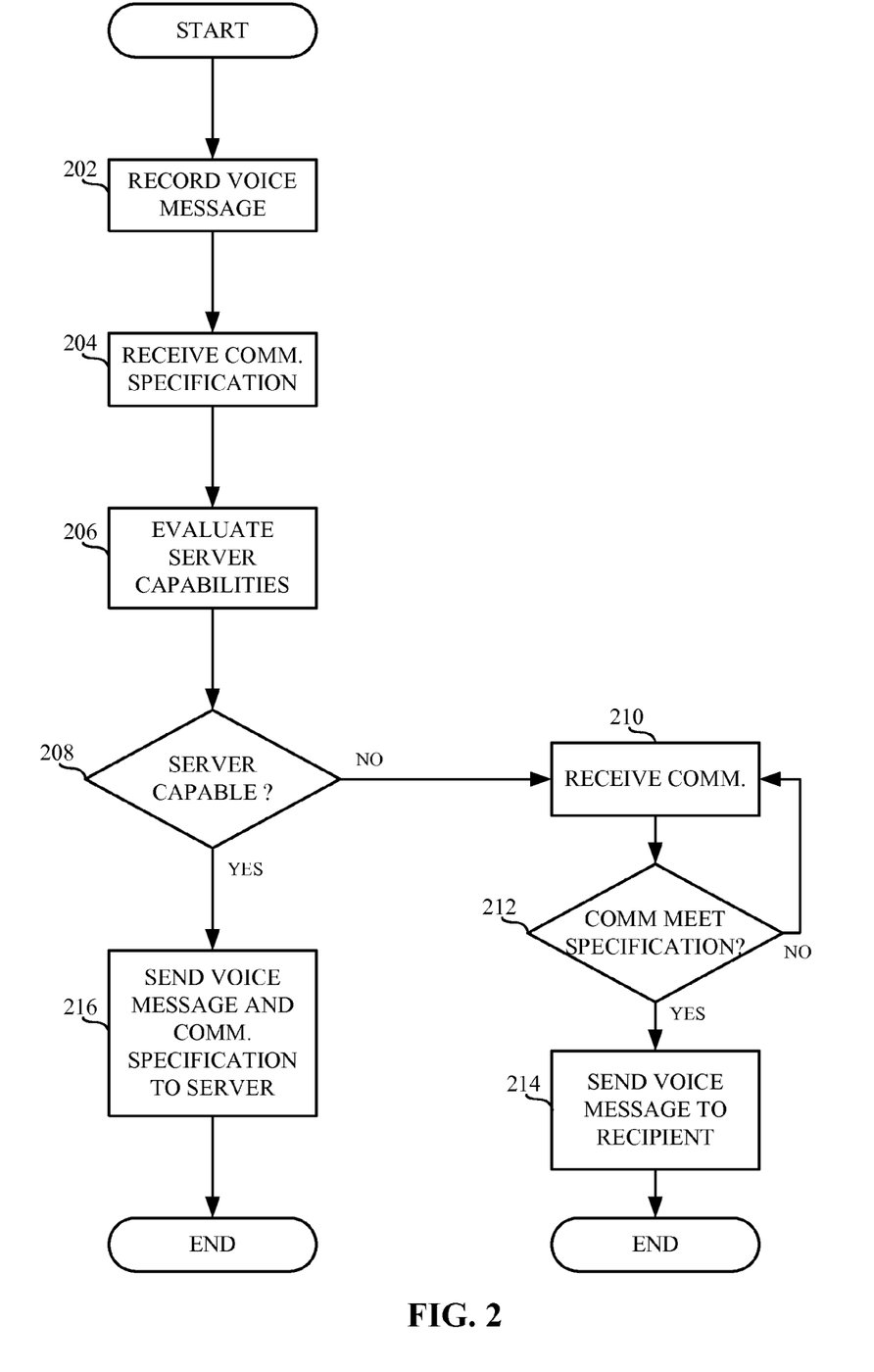
FIG. 2 depicts an example flow diagram representative of a process, which may be implemented using computer readable instructions on a mobile device that may be used to record and send voice messages in accordance with the system of FIG. 1.
Figure 4:
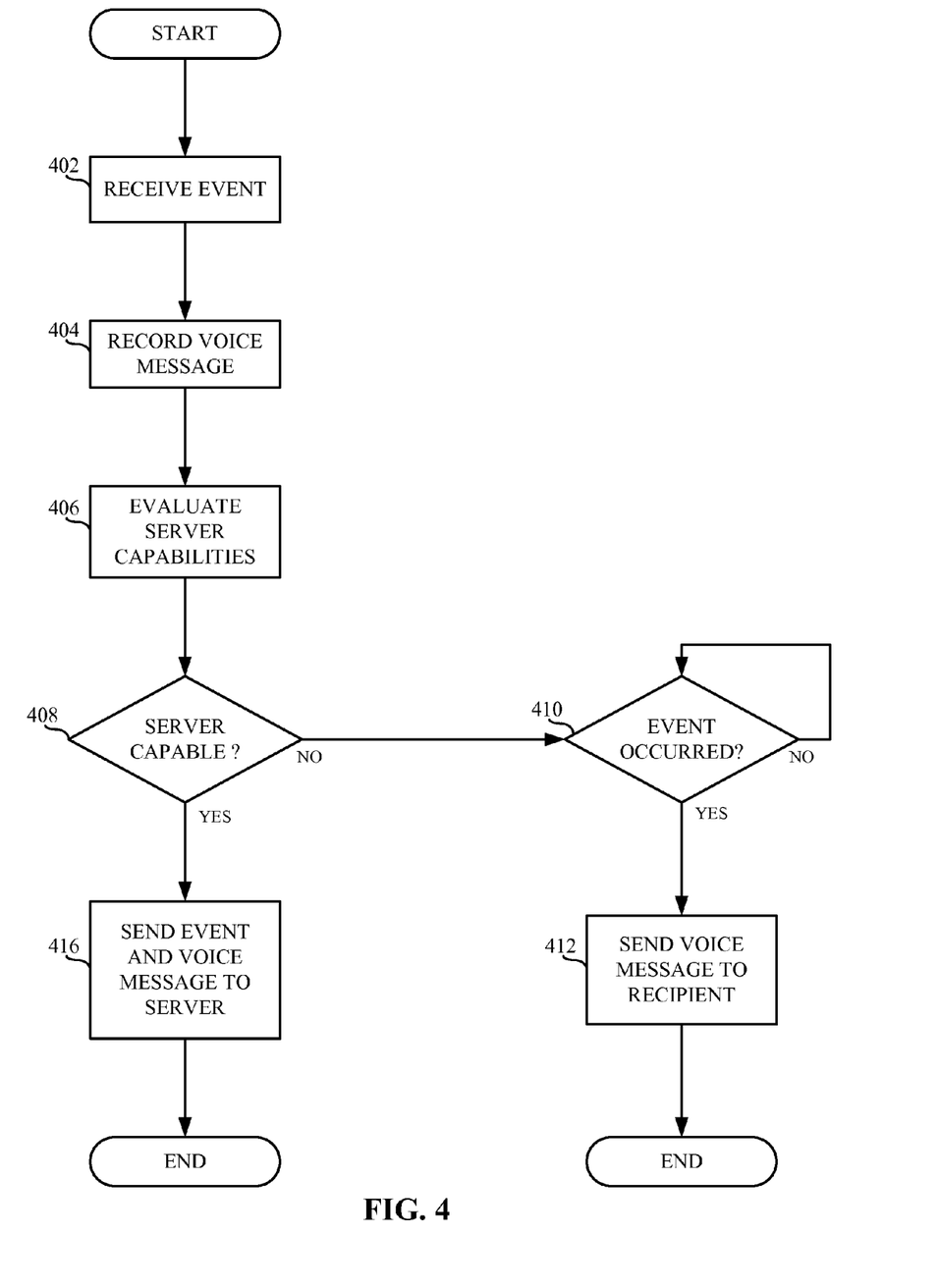
FIG. 4 depicts an example flow diagram representative of an alternate process, which may be implemented using computer readable instructions on a mobile device that may be used to record and send voice messages in accordance with the system of FIG. 1.

In the illustrated example, the processes of FIGS. 2 and 4 are described below as performed by the mobile device 102 of FIG. 1. However, the example processes of FIGS. 2 and 4 may additionally or alternatively be implemented using any other suitable device or apparatus.

Now turning to FIG. 2, an example process to send voice messages is shown. The process of FIG. 2 may be implemented using, for example, computer-readable instructions or any suitable combination of hardware and/or software and may be implemented on the mobile device 102 of FIG. 1. The mobile device 102 records one or more voice messages, as well as an indication of the destination for the voice messages (block 202). In one example, the destination may be specified by a telephone number, an electronic mail address, or any other suitable indicator of the intended recipient.

If the voice message is to be sent to the recipient based on receipt of communication from a particular entity, a specification of that communication is received by the mobile device (block 204). For example, if the user of the mobile device 102 desires to specify that the voice message is to be sent upon receiving a communication from person X, an indicator of person X is provided as the communication specification. The indicator may be the identity of person X, the telephone of person X, an electronic mail address of person X, or any other suitable indicator.

The mobile device 102 evaluates server capabilities (block 206) to determine if any servers are available to store the voice message and to evaluate the communication specification against incoming communications. For example, the mobile device 102 may query the server 108 or the voicemail server 106 to determine if storage and evaluation resources are available.

If there is no server capable of the needed storage and evaluation functionality, the mobile device 102 handles the storage and evaluation itself. Thus, the mobile device 102 receives communication (block 210) and determines if the communication meets the specification (block 212). For example, the mobile device 102 determines whether communication (e.g., an electronic mail) has been received from person X at the mobile device 102 or at a server (e.g., the voicemail server 106 or the server 108) having an account associated with the mobile device 102.

The evaluation (block 212) will continue and, when the communication specification is met (e.g., an electronic mail is received from person X), the mobile device sends the voice message to the recipient (block 214). According to this approach, the voice message may be stored in the mobile device 102 and sent to the recipient from the mobile device 102. In another example, the voice message may be stored separately from the mobile device 102 and the mobile device 102 may provide a trigger for the voice message to be sent. For example, the voice message may be stored in the voicemail server 106 and the mobile device 102 may trigger sending of the message from the voicemail server 106.

Alternatively, if a capable server is available (block 208), the mobile device 102 sends the voice message and the communication specification to the server (block 216). For example, if the mobile device 102 determines that the server 108 is available for the voice message storage and communication specification, the voice message and the communication specification may be provided to the server 108, which stores the voice message and the communication specification (e.g., rules). While the determination of server capabilities is shown as occurring after the recording of the voice mail message, this is not necessarily the case. In accordance with the foregoing example, the server 108 may operate as shown in FIG. 3.

Figure 3:
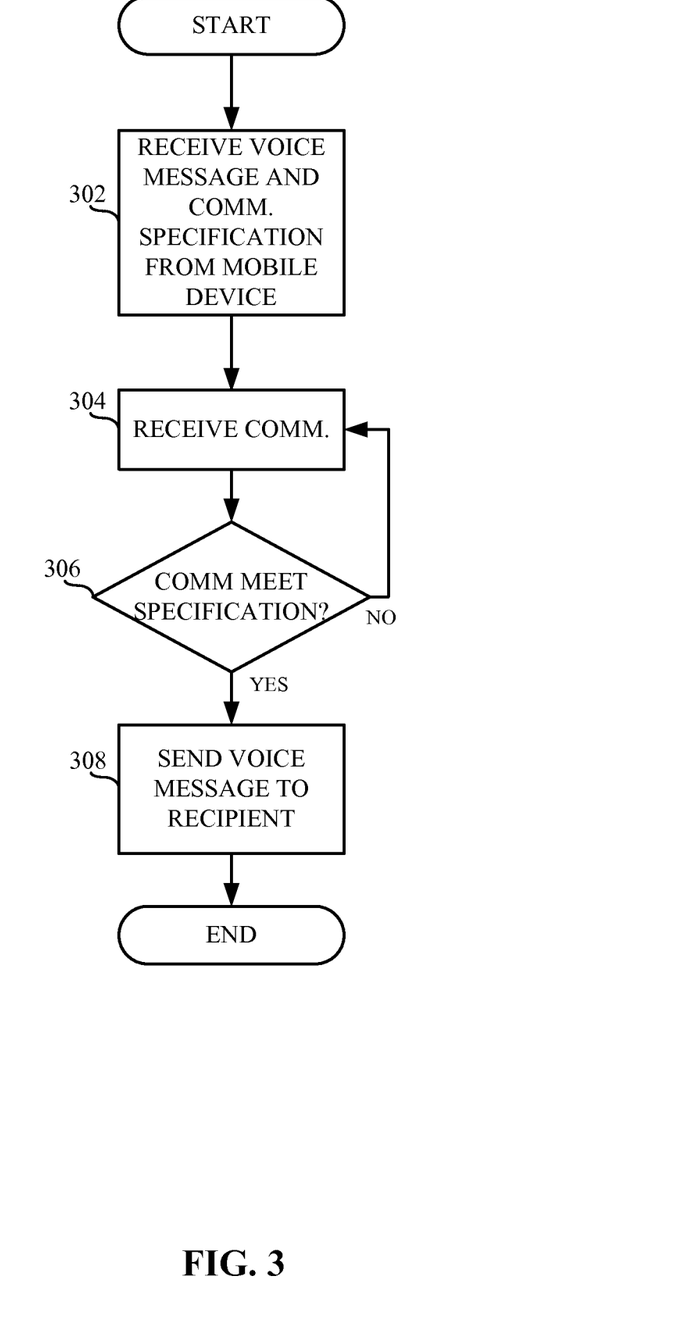
FIG. 3 depicts an example flow diagram representative of a process, which may be implemented using computer readable instructions on a server that may be used to send voice messages in accordance with the system of FIG. 1.

In the example of FIG. 3, the server 108 receives the voice message and the communication specification from the mobile device 102 (block 302). Additionally, the server 108 receives communication (block 304) and evaluates the communication to determine whether the communication meets the specification (block 306). When a communication meets the communication specification (block 306), the voice message is sent to the recipient (block 308). The voice message may be sent to the recipient directly from the server 108 or may be sent to the recipient via the voicemail server 106.

FIG. 4 is an example process to send voice messages in response to occurrence of a predefined event. The process of FIG. 4 may be implemented using, for example, computer-readable instructions or any suitable combination of hardware and/or software and may be implemented on the mobile device 102 of FIG. 1. The mobile device 102 receives an event, such as a calendar event (e.g., an appointment, a meeting, etc.) (block 402) and records one or more voice messages, as well as an indication of the destination for the voice messages (block 404) after the event is recorded. The voice message is to be sent to recipients in response to the occurrence of the event. For example, a voice message reminder may be sent in advance of a meeting calendar event. In one example, the destination for the voice message may be specified in the event information by a telephone number, an electronic mail address, or any other suitable indicator of the intended recipient.

The mobile device 102 evaluates server capabilities (block 406) to determine if any servers are capable of storing the voice message and evaluating whether the specified event has occurred (block 408). For example, the mobile device 102 may query the server 108 or the voicemail server 106 to determine if storage and evaluation resources are available. In one particular example, the server 108, as described above, may include the calendar 144 including the events and associated event information and the message storage 142. As such, the server 108 may be particularly well suited to evaluate whether the specified even has occurred.

If there is no server capable of the needed storage and evaluation, the mobile device 102 determines if the event has occurred (block 410). For example, the mobile device 102 determines whether a calendar event has occurred. The evaluation (block 410) will continue and when the communication specification is met (e.g., a particular calendar event has occurred), the mobile device sends the voice message to the recipient (block 412). According to this approach, the voice message may be stored in the mobile device 102 and sent to the recipient from the mobile device or the voice message may be stored separately from the mobile device 102 and the mobile device may provide a trigger for the voice message to be sent. For example, the voice message may be stored in the voicemail server 106 and the mobile device 102 may trigger sending of the message from the voicemail server 106.

Alternatively, if a capable server is available (block 408), the mobile device 102 sends the voice message and the event to the server (block 416). For example, if the mobile device 102 determines that the server 108 is available for the voice message storage 142 and event storage 144, the voice message and the event may be provided to the server 108. While the determination of server capabilities is shown as occurring after the recording of the voice mail message, this is not necessarily the case. In accordance with the foregoing example, the server 108 may operate as shown in FIG. 5.

Figure 5:
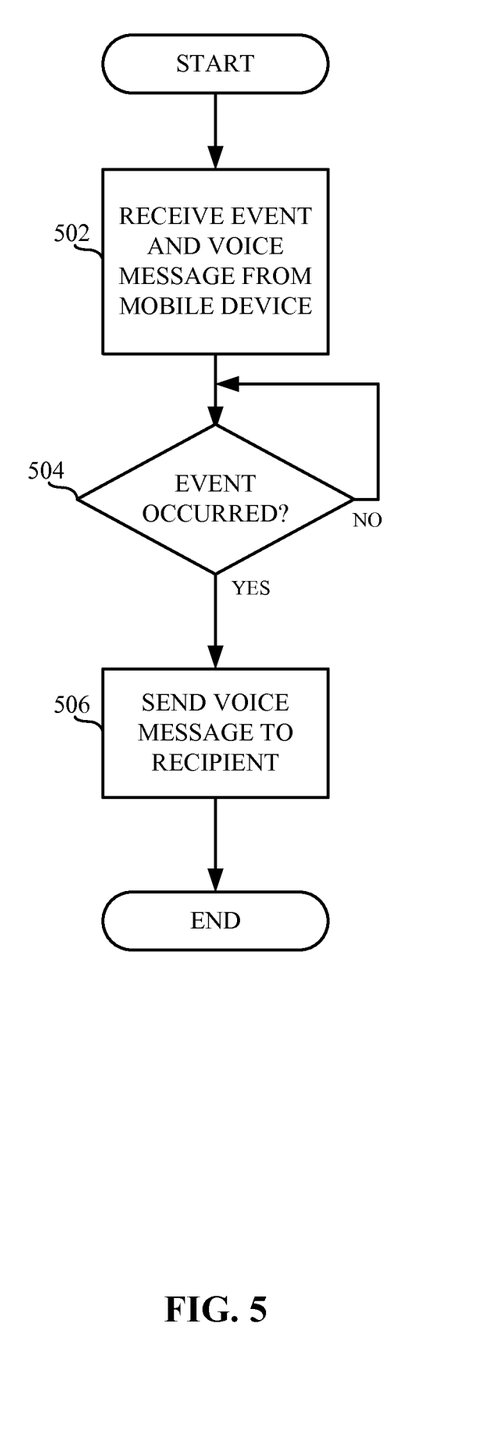
FIG. 5 depicts an example flow diagram representative of an alternate process, which may be implemented using computer readable instructions on a server that may be used to send voice messages in accordance with the system of FIG. 1.

In the example of FIG. 5, the server 108 receives the voice message and the event from the mobile device 102 (block 502). The server 108 determines whether the event has occurred (block 504). When the event has occurred (block 504), the voice message is sent to the recipient (block 506). The voice message may be sent to the recipient directly from the server 108 or may be sent to the recipient via the voicemail server 106.

Figure 6:
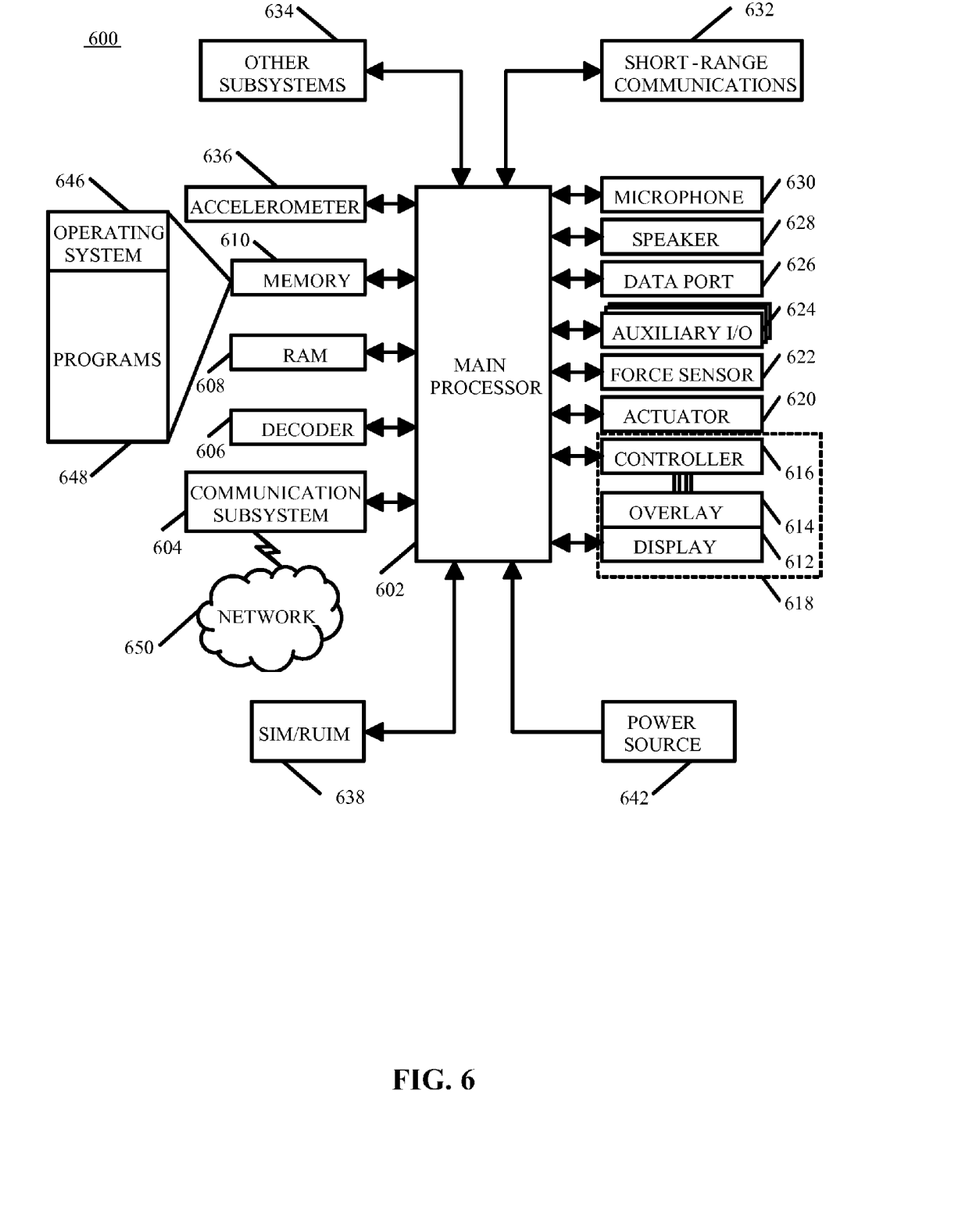
FIG. 6 is a block diagram of a mobile device in accordance with the disclosure.

Further detail of certain aspects of the mobile devices 102, 104 of FIG. 1 are shown in FIG. 6 with respect to a mobile, or portable electronic, device 600. The mobile device 600 includes multiple components, such as a processor 602 that controls the overall operation of the mobile device 600. Communication functions, including data and voice communications, are performed through a communication subsystem 604. Data received by the mobile device 600 is decompressed and decrypted by a decoder 606. The communication subsystem 604 receives messages from and sends messages to a wireless network 650. The wireless network 650 may be any type of wireless network, including, but not limited to, data wireless networks, voice wireless networks, and networks that support both voice and data communications. A power source 642, such as one or more rechargeable batteries or a port to an external power supply, powers the mobile device 600.

The processor 602 interacts with other components, such as Random Access Memory (RAM) 608, memory 610, a display 612 with a touch-sensitive overlay 614 operably coupled to an electronic controller 616 that together comprise a touch-sensitive display 618, one or more actuators 620, one or more force sensors 622, an auxiliary input/output (I/O) subsystem 624, a data port 626, a speaker 628, a microphone 630, short-range communications 632, and other device subsystems 634. In one example, the processor 602 and the memory 610 may cooperate to implement the functionality described in conjunction with the controllers 124 and 134 of FIG. 1. For example, tangible and/or non-transitory, and/or machine readable instructions may be stored by the processor 602 and/or the memory 610 to implement the functionality shown in FIGS. 2-4.

Input via a graphical user interface is provided via the touch-sensitive overlay 614. The processor 602 interacts with the touch-sensitive overlay 614 via the electronic controller 616. Information, such as text, characters, symbols, images, icons, and other items that may be displayed or rendered on a mobile device, is displayed on the touch-sensitive display 618 via the processor 602. The processor 602 may interact with an accelerometer 636 that may be utilized to detect direction of gravitational forces or gravity-induced reaction forces.

To identify a subscriber for network access, the mobile device 600 may utilize a Subscriber Identity Module or a Removable User Identity Module (SIM/RUIM) card 638 for communication with a network, such as the wireless network 650. Alternatively, user identification information may be programmed into memory 610.

The mobile device 600 includes an operating system 646 and software programs, applications, or components 648 that are executed by the processor 602 and are typically stored in a persistent, updatable store such as the memory 610. Additional applications or programs may be loaded onto the mobile device 600 through the wireless network 650, the auxiliary I/O subsystem 624, the data port 626, the short-range communications subsystem 632, or any other suitable subsystem 634.

A received signal such as a text message, an e-mail message, or web page download is processed by the communication subsystem 604 and input to the processor 602. The processor 602 processes the received signal for output to the display 612 and/or to the auxiliary I/O subsystem 624. A subscriber may generate data items, for example e-mail messages, which may be transmitted over the wireless network 650 through the communication subsystem 604. For voice communications, the overall operation of the mobile device 600 is similar. The speaker 628 outputs audible information converted from electrical signals, and the microphone 630 converts audible information into electrical signals for processing.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
receiving information associated with an event, the information including an indication of at least one destination for a voice message;
recording the voice message through a microphone of a mobile communication device;
subsequent to receiving the information, associating the recorded voice message with the event;
determining capabilities of a multiplicity of servers associated with the mobile communication device to determine whether any of the multiplicity of servers is capable of evaluating that the event has occurred; and
upon determining that no server of the multiplicity of servers is capable of evaluating that the event has occurred, prior to a determination that the event has occurred, sending to the at least one destination, from the mobile communication device, the voice message that had been recorded through the microphone of the mobile communication device reminding of the event.

2. The method of claim 1, wherein the voice message is included in an electronic mail message.

3. The method of claim 1, wherein the voice message is included in a short message service communication.

4. The method of claim 1, wherein the voice message is received at a remote mobile communication device.

5. The method of claim 1, further comprising, upon determining that a server of the multiplicity of servers is capable of evaluating that the event has occurred, sending the information and the voice message to the server capable of evaluating that the event has occurred.

6. The method of claim 1, further comprising providing a confirmation on a display of the mobile communication device that the voice message has been transmitted.

7. The method of claim 5, further comprising, prior to a determination that the event has occurred, sending the voice message to the at least one destination from the server capable of evaluating that the event has occurred, reminding of the event.

8. The method of claim 1, wherein determining capabilities of the multiplicity of servers associated with the mobile communication device further comprises determining whether any of the multiplicity of servers is capable of storing the voice message.

9. A method comprising:
recording a voice message through a microphone of a mobile communication device;
receiving at the mobile communication device information associated with a pre-determined event;
determining capabilities of a multiplicity of servers associated with the mobile communication device to determine whether any of the multiplicity of servers is capable of evaluating that the event has occurred; and
subsequent to receiving the information, receiving at the mobile communication device a specification of an association between the pre-determined event and the voice message, wherein upon determining that a server of the multiplicity of servers is capable of evaluating that the event has occurred, prior to occurrence of the pre-determined event, the voice message that had been recorded through the microphone of the mobile communication device is sent to the server capable of evaluating that the event has occurred.

10. The method of claim 9, wherein the pre-determined event comprises a meeting.

11. The method of claim 9, wherein the pre-determined event comprises an appointment.

12. The method of claim 9, wherein the information associated with the pre-determined event is stored at the server capable of evaluating that the event has occurred.

13. The method of claim 9, further comprising, prior to occurrence of the pre-determined event, sending the voice message from the server capable of evaluating that the event has occurred to a remote mobile communication device as a reminder of the pre-determined event.

14. The method of claim 13, further comprising providing a confirmation on a display of the mobile communication device that the voice message has been transmitted.

15. The method of claim 9, wherein determining capabilities of the multiplicity of a servers associated with the mobile communication device further comprises determining whether any of the multiplicity of servers is capable of storing the voice message.

16. A mobile communications device comprising:
a housing;
a display carried by the housing;
a wireless receiver and transmitter carried by the housing;
a processor carried by the housing, coupled to the wireless receiver and transmitter, and coupled to the display, the processor configured to record a voice message through a microphone of the mobile communications device, receive information associated with a pre-determined event, subsequent to receiving the information receive a specification of an association between the pre-determined event and the voice message, determine capabilities of a multiplicity of servers associated with the mobile communication device to determine whether any of the multiplicity of servers is capable of evaluating that the event has occurred, wherein upon determining that no server of the multiplicity of servers is capable of evaluating that the event has occurred and prior to occurrence of the pre-determined event, the voice message that had been recorded through the microphone of the mobile communication device is sent to a remote device.

17. The mobile device of claim 16, wherein the pre-determined event comprises one or more of a meeting and an appointment.

18. The method of claim 5, wherein the server capable of evaluating that the event has occurred includes a calendar, the event and the information associated with the event.

19. The method of claim 9, wherein the server capable of evaluating that the event has occurred includes a calendar, the pre-determined event and the information associated with the pre-determined event.

20. The method of claim 9, wherein upon determining that no server of the multiplicity of servers is capable of evaluating that the event has occurred, prior to occurrence of the pre-determined event, the voice message that had been recorded through the microphone of the mobile communication device is sent from the mobile communication device to a remote device.

* * * * *